(12) United States Patent
Duquesne et al.

(10) Patent No.: US 9,814,179 B2
(45) Date of Patent: Nov. 14, 2017

(54) COMBINE HARVESTER COMPRISING A STRAW WALKER CONTROL SYSTEM

(71) Applicant: CNH Industrial America LLC, New Holland, PA (US)

(72) Inventors: Frank R. G. Duquesne, Zwevegem (BE); Bart M. A. Missotten, Herent (BE); Tom N. N. Somers, Aalter (BE); Johan A. Van Der Haegen, Gavere (BE)

(73) Assignee: CNH Industrial America LLC, New Holland, PA (US)

( * ) Notice: Subject to any disclaimer, the term of this patent is extended or adjusted under 35 U.S.C. 154(b) by 317 days.

(21) Appl. No.: 14/758,809

(22) PCT Filed: Jan. 2, 2014

(86) PCT No.: PCT/EP2014/050014
§ 371 (c)(1),
(2) Date: Jul. 1, 2015

(87) PCT Pub. No.: WO2014/106633
PCT Pub. Date: Jul. 10, 2014

(65) Prior Publication Data
US 2015/0342119 A1    Dec. 3, 2015

(30) Foreign Application Priority Data
Jan. 3, 2013   (BE) .................................. 2013/0006

(51) Int. Cl.
*A01D 41/127*    (2006.01)
*G05D 19/02*    (2006.01)
*A01D 75/28*    (2006.01)
*G05B 15/02*    (2006.01)
*A01F 17/02*    (2006.01)
(Continued)

(52) U.S. Cl.
CPC ........... *A01D 41/127* (2013.01); *A01D 61/02* (2013.01); *A01D 75/28* (2013.01); *A01D 75/282* (2013.01); *A01F 12/38* (2013.01); *A01F 12/56* (2013.01); *A01F 17/02* (2013.01); *F16H 9/18* (2013.01); *G05B 15/02* (2013.01); *G05D 19/02* (2013.01); *F16H 2009/166* (2013.01)

(58) Field of Classification Search
USPC .......................................................... 701/50
See application file for complete search history.

(56) References Cited

U.S. PATENT DOCUMENTS 2,639,569 A    5/1953   Pasturczak
3,470,681 A   10/1969   Saemann
(Continued)

FOREIGN PATENT DOCUMENTS

DE    102005050751 A1    8/2007
DE    102006006938 A1    8/2007
(Continued)

*Primary Examiner* — Tyler J Lee
(74) *Attorney, Agent, or Firm* — Patrick M. Sheldrake (57) ABSTRACT

A combine harvester has an inclination module coupled to the straw walker control system. The inclination module provides information on the inclination of the combine harvester. The straw walker control system is further configured to control the controllable frequency of the oscillating movement in function of the information on the inclination of the combine harvester.

14 Claims, 6 Drawing Sheets

(51) Int. Cl.
*A01D 61/02* (2006.01)
*A01F 12/38* (2006.01)
*A01F 12/56* (2006.01)
*F16H 9/18* (2006.01)
*F16H 9/16* (2006.01)

(56) References Cited

U.S. PATENT DOCUMENTS

| | | | |
|---|---|---|---|
| 4,400,930 A | 8/1983 | Huhman et al. | |
| 4,408,618 A * | 10/1983 | Witzel | A01F 7/06 460/80 |
| 5,873,227 A | 2/1999 | Arner | |
| 5,995,895 A | 11/1999 | Watt et al. | |
| 6,068,059 A | 5/2000 | Bajema et al. | |
| 6,525,276 B1 * | 2/2003 | Vellidus | A01B 79/005 177/136 |
| 7,308,326 B2 * | 12/2007 | Maertens | A01D 41/12 56/10.2 A |
| 7,487,024 B2 | 2/2009 | Farley et al. | |
| 9,008,918 B2 | 4/2015 | Missotten et al. | |
| 2002/0091476 A1 * | 7/2002 | Beck | A01D 41/1271 701/50 |
| 2005/0279073 A1 | 12/2005 | Clauss et al. | |
| 2006/0229119 A1 * | 10/2006 | Wamhof | A01D 75/282 460/101 |
| 2009/0088932 A1 * | 4/2009 | Diekhans | A01D 41/127 701/50 |
| 2010/0096301 A1 | 4/2010 | Nyborg et al. | |
| 2013/0205733 A1 * | 8/2013 | Peters | A01D 41/127 56/10.1 |

FOREIGN PATENT DOCUMENTS

| | | |
|---|---|---|
| DE | 102011007511 A1 | 10/2012 |
| EP | 1584225 A1 | 10/2005 |
| GB | 1108773 A | 4/1968 |
| GB | 2048040 A | 12/1980 |
| GB | 2067434 A | 7/1981 |
| JP | 2010213625 A | 9/2010 |

* cited by examiner

COMBINE HARVESTER COMPRISING A STRAW WALKER CONTROL SYSTEM

This application is the US National Stage filing of International Application Serial No. PCT/EP2013/050014 filed on Jan. 2, 2014 which claims priority to Belgian Application BE2013/0006 filed Jan. 3, 2013, each of which is incorporated herein by reference in its entirety.

FIELD OF THE INVENTION

The present invention generally relates to a combine harvester comprising a straw walker that can be operated at a controllable oscillation frequency.

BACKGROUND OF THE INVENTION

When a combine harvester with a straw walker that operates at a fixed oscillation frequency travels uphill, as a consequence of this, the transport velocity of the crop on the straw walker will be increased, leading to the risk of increased grain loss as time is shortened during which the crop material is handled by the straw walker. When such a combine harvester is traveling downhill, the transport velocity of the crop on the straw walker will decrease and there will be a decrease in throughput and also a risk for the formation of plugs as the crop material takes more time to travel along the straw walker as the crop material layer on the straw walker will become too thick, which also is not optimal for separation of the grain and could thus also lead to increased grain loss.

It is proposed in M. Gubsch, "Der Einfluss der Längsneigung auf das Abscheidungs-und Förderverhalten des Strohschüttlers", Archiv der Landtechnik Band 8 (1969), part 2/3, pages 127-139, to change the oscillation frequency of the straw walker in function of the longitudinal inclination of the combine harvester in order to counteract the effect of the longitudinal inclination. However no embodiment of such a straw walker drive system and associated control system was proposed.

EP1584225 proposed a straw walker drive system and associated control system that enabled control of the oscillation frequency as well as the stroke of the oscillation of the straw walker drive system. However such a combine harvester requires an intermediate frame which complicates the construction of the straw walker drive system and makes it almost impossible to retrofit an existing combine harvester with such a system. Furthermore the control system makes use of a correlation between the throughput of the crop material and an optimal transport velocity for this particular throughput of crop material. For assessing the throughput of the crop material there are required throughput sensors that assess the amount of crop material that is handled during a predetermined time period by the combine harvester. It has been found that such a control system is not optimal as it lacks the necessary precision because the signal provided by the throughput sensors is very noisy. Furthermore some embodiments of these sensors require the sensors to be arranged in close proximity to the crop flow, which subjects them to hostile operating conditions comprising long term contact with dirt, moisture, dust, etc. even further reducing long term reliability of the measurements of these throughput sensors. It has also been found that responsiveness of the control system in some circumstances can be too low, mainly because of the inertia of the straw walker drive system and the fact that the throughput sensors measure the throughput of the crop material when it is already being processed by the combine harvester. In this way the straw walker control system might not be able to handle sudden changes in throughput efficiently, such as for example occurring when a combine travels past the lowest point of a valley where its longitudinal inclination rapidly changes from a downward slope to an upward slope. Throughput sensors arranged in the feeder will not even notice such a change if the combine keeps on travelling at the same speed as the amount of incoming crop material at the header and feeder will not change noticeably. However this change in longitudinal inclination will instantly increase the transport speed of the crop material on the straw walker which eventually could cause increased grain loss or a plug. Although these changes can be detected with embodiments of throughput sensors which measure the thickness of the crop material layer on the straw walker or the grain loss sensors arranged at the end of the straw walker, such an assessment will only be made when the effect is already clearly available at the level of the straw walker, and in the case of the grain loss sensor, at the end of the straw walker. So when additionally taking into account the delay caused by the inertia of the oscillating straw walker, such a control system will not be able to deal timely with such sudden changes and additionally such delays will cause the control system to divert considerably from the optimal set-point, and overshoot it considerably during the time period following such changes.

A further straw walker drive system with controllable oscillation frequency is shown in DE102005050751. This straw walker drive system does not require an intermediate frame and makes use of a belt variator in the straw walker drive system, which simplifies the construction considerably. However it still remains cumbersome to retrofit such a system to an existing combine harvester as it requires at least replacement of the pulley that is mounted to the crankshaft of the straw walker drive system of the combine harvester with a belt variator. This operation is complex and requires a bulky design of the belt variator. Additionally the straw walker drive control system requires the use of sensors that assess the transport speed of the crop on the straw walker during operation. Such sensors are generally not available in existing combine harvesters and thus lead to major modifications to the combine harvester control system in order to connect to such sensors. Furthermore such sensors operate in extremely harsh conditions which affects their reliability and precision. On top of that these sensors assessing the transport velocity are arranged at the height of the straw walker and also here the effect will only be detected when it is already clearly available on the straw walker, which when taking into account the delay caused by the inertia of the oscillating straw walker will lead to diversion of the optimal set-point and overshoot, especially in the case of a sudden change in the longitudinal inclination of the combine as explained above. Additionally the control system aims to achieve a constant transport velocity for the crop material on the straw walker. It has been found that maintaining such a constant transport velocity is not able to guarantee an efficient operation of the straw walker, especially if changes in the longitudinal inclination of the combine harvester occur. This is because at different longitudinal inclinations of the combine harvester the mean angle at which the crop material is excited by the straw walker elements changes, and thus when the time period during which the crop material is handled by the straw walker is kept constant, the effect of the excitation by the straw walker elements will be different when the longitudinal inclination of the combine harvester changes, still further leading to diversion of the optimal set-point of the control system.

Thus there still remains a desire for a straw walker drive and associated control system for a combine harvester that overcomes the above mentioned drawbacks, is able to ascertain an increase in the long-term efficiency of the operation of the straw walker by means of a control system with a higher precision and increased responsiveness, is of a simple construction, can be easily retrofitted to existing combine harvester designs and does not require the use of throughput sensors or transport velocity sensors at the height of the straw walker.

SUMMARY OF THE INVENTION

According to a first aspect of the invention there is provided a combine harvester comprising:
 a straw walker;
 a straw walker drive system connected to the straw walker and configured to drive the straw walker with an oscillating movement at a controllable frequency; and
 a straw walker control system connected to the straw walker drive system and configured to control the controllable frequency of the oscillating movement,
 CHARACTERIZED IN THAT
 the combine harvester further comprises an inclination module coupled to the straw walker control system, the inclination module being configured to provide information on an inclination of the combine harvester; and in that
 the straw walker control system further comprises a configuration module comprising a predetermined correlation between the controllable frequency of the oscillating movement and the information on the inclination of the combine harvester, the straw walker control system being further configured to control the controllable frequency of the oscillating movement in function of the information on the inclination of the combine harvester by means of the predetermined correlation.

In this way the combine harvester is provided with a straw walker control system that is able to react faster, with more precision and with less risk of overshoot in case of sudden changes as the system does not have to wait until changes in transport velocity or throughput of the crop material start to occur at the height of the straw walker, but can immediately start adjusting the operation of the straw walker drive system, even before any changes are noticeable in the functioning of the straw walker itself. Reliability is further improved as the inclination of the combine harvester can generally be measured with a higher precision and less noise and the sensors can be arranged in less hostile operating environments than throughput or transport velocity sensors, According to a preferred embodiment the predetermined correlation comprises:
 first value of the information on inclination,
 a second value of the information on inclination which relates to an inclination that is higher than the inclination related to the first value; and in that
 a rate of change of the controllable frequencies correlated to the first value is lower than a rate of change of the controllable frequency correlated to the second value.

It has been found that by means of such a specific correlation the straw walker drive control system is able to optimally reduce overshoot in case of considerable short term changes to the longitudinal inclination of the combine, which for example occur at the bottom of a valley when the combine switches from downhill to uphill operation in a relatively short time period. Such a specific correlation is also able to take into account the effect of the change in the throwing angle of the crop material with respect to the straw walker elements, when it is processed by the straw walker at varying longitudinal inclinations of the combine. As explained above, when the control system is operated to achieve a constant transport velocity of the crop material on the straw walker, this effect of the excitation by the straw walker elements being different when the longitudinal inclination of the combine harvester changes is not taken into account.

According to still a further embodiment the configuration module comprises a configuration storage module comprising a plurality of stored predetermined correlations for a corresponding plurality of crop types and/or harvesting conditions, and the predetermined correlation is selectable from the plurality of stored predetermined correlations.

According to still a further embodiment the combine harvester comprises a header with an identification module that is coupled to the configuration module, and
 the configuration module is arranged to automatically select the predetermined correlation in function of the crop type correlated to the type of header as identified by the identification module.

This allows for a user friendly selection and semi-automated selection of the most relevant correlation for the straw walker drive control system.

According to a further embodiment the straw walker control system further comprises a calibration module connected to the correlation module and at least one evaluation sensor configured to evaluate an operating parameter of the straw walker, the calibration module being configured to modify the predetermined correlation in function of the measurements of the at least one evaluation sensor.

Optionally during a calibration routine, the calibration module is configured to:
 apply at least one predetermined modification to the at least one predetermined correlation;
 modify the at least one predetermined correlation if one of the predetermined modifications leads to a predetermined change in the measurements of the at least one evaluation sensor.

The evaluation sensor is for example a grain loss sensor.

These embodiments of the configuration and calibration module allow for automated optimisation and fine-tuning of the correlation function to the specific harvesting conditions as they occur, for example before or during a harvesting operation.

According to a further embodiment the inclination module comprises an inclination sensor configured to detect the inclination of the combine harvester.

This enables a simple embodiment making use of sensor technology that is generally available on existing combine harvesters.

According to a further embodiment the straw walker control system is further coupled to a positioning module connected to the inclination module and configured to provide information on the position and orientation of the combine harvester, and in that
 the inclination module comprises a field inclination module comprising field inclination information correlated to specific positions on the field, the field inclination module being configured to calculate the inclination of the combine harvester from the position and the orientation of the combine harvester and the field inclination information.

This also enables a simple embodiment making use of sensor technology, such as for example gps technology, that is generally available on existing combine harvesters or can be easily retrofitted to it.

According to a preferred embodiment the straw walker control system further comprises a planning module connected to the positioning module and the inclination module, the planning module being configured to provide information on planned, future positions and planned, future orientations of the combine harvester, and in that the field inclination module is further configured to calculate a planned, future inclination of the combine harvester from a planned, future field inclination information relating to the planned, future position and the planned, future orientation of the combine harvester.

This allows pro-active control of the straw walker drive system, instead of only a re-active control, which enables to take into account the effects of the inertia of the straw walker drive system. Such a planning module is available in existing combine designs as precision farming planning technology and can also be easily retrofitted to existing combine harvesters.

According to still a preferred embodiment the straw walker control system is further coupled to a field recording module connected to the field inclination module, the field recording module being configured to record the field inclination information at a current position of the combine harvester, and in that the field inclination module is further configured to calculate the planned future field inclination information from the recorded field inclination information.

In this way the control system does not require extensive and complete prior knowledge of the field characteristics in order to enable a pro-active control of the straw walker drive system.

According to a further embodiment the information on the inclination of the combine harvester comprises information on the longitudinal inclination of the combine harvester.

This allows for a simple and efficient setup of the straw walker drive control system as the longitudinal inclination of the combine harvester has the most impact on the transport velocity and throwing angle of the crop material on the straw walker.

According to an embodiment the combine harvester further comprises a main drive system providing a continuous rotary motion at a predetermined frequency, and in that the straw walker drive system is connected to the main drive system and comprises:

at least one belt variator system connected to the main drive system, coupled to the straw walker control system and configured to be controlled by the straw walker control system to transform the continuous rotary motion at the predetermined frequency of the main drive system in a continuous rotary motion at the controllable frequency, at least one crankshaft connected to the belt variator system and the straw walker to transform the continuous rotary motion at the controllable frequency into the oscillating movement at the controllable frequency.

Preferably the belt variator system comprises:

A rotational shaft;

A first variator disc and a second variator disc arranged at a fixed distance with respect to each other at both axial ends of the rotational shaft;

A central variator disc arranged between the first variator disc and the second variator disc, the central variator disc or the first and second variator discs being movable along the axial direction of the rotational shaft to change a first and a second transverse distance between the central variator disc and the first and second variator disc respectively;

A first variator belt connected at one end to a first pulley of the main drive system and arranged at its other end between the first variator disc and the central variator disc;

A second variator belt at one end arranged between the second variator disc and the central variator disc, and at its other end connected to a second pulley of the crankshaft;

A variator positioning system connected to the rotational shaft and comprising an actuator configured to control the position of the rotational shaft with respect to the first pulley and the second pulley causing a first and second center distance between the rotational shaft and respectively the first and second pulley to change in order to transform the continuous rotary motion at the predetermined frequency in the continuous rotary motion at the controllable frequency.

This embodiment and arrangement of the belt variator allows a simple and reliable construction and allows easy retrofitting to an existing combine design as it does not require any modification to the pulleys of the crankshaft and the main drive. Additionally this embodiment of the belt variator allows the use of a single belt tensioner 216 for providing sufficient tension to both belts of the variator. Preferably, when for example modifying an existing combine design, proper tensioning can be provided by the belt tensioner 216, without requiring a modification of the existing design of the belt tensioner.

According to a second aspect of the invention, there is provided a method for operating a combine harvester according to the first aspect of the invention, characterised in that the method comprises the steps of:

the straw walker control system receiving an input signal representative of the information on the inclination of the combine harvester provided by the inclination module;

the straw walker control system calculating an output signal by processing the input signal by means of the predetermined correlation between the controllable frequency of the oscillating movement and the information on the inclination of the combine harvester; and the straw walker control system providing the output signal for controlling the controllable frequency of the oscillating movement.

According to an embodiment of this method, the input signal is representative for one or more of the following:

a derivative of a height position of the combine harvester with respect to time or a longitudinal position of the combine harvester;

a ratio of the differences of two height positions of the combine harvester with respect the corresponding two points in time or longitudinal positions of the combine harvester; and the output signal is representative for one or more of the following:

an absolute value for the controllable frequency of the oscillating movement;

a relative value with respect to a reference value for the controllable frequency of the oscillating movement.

DETAILED DESCRIPTION OF EMBODIMENT(S)

Figure 1:
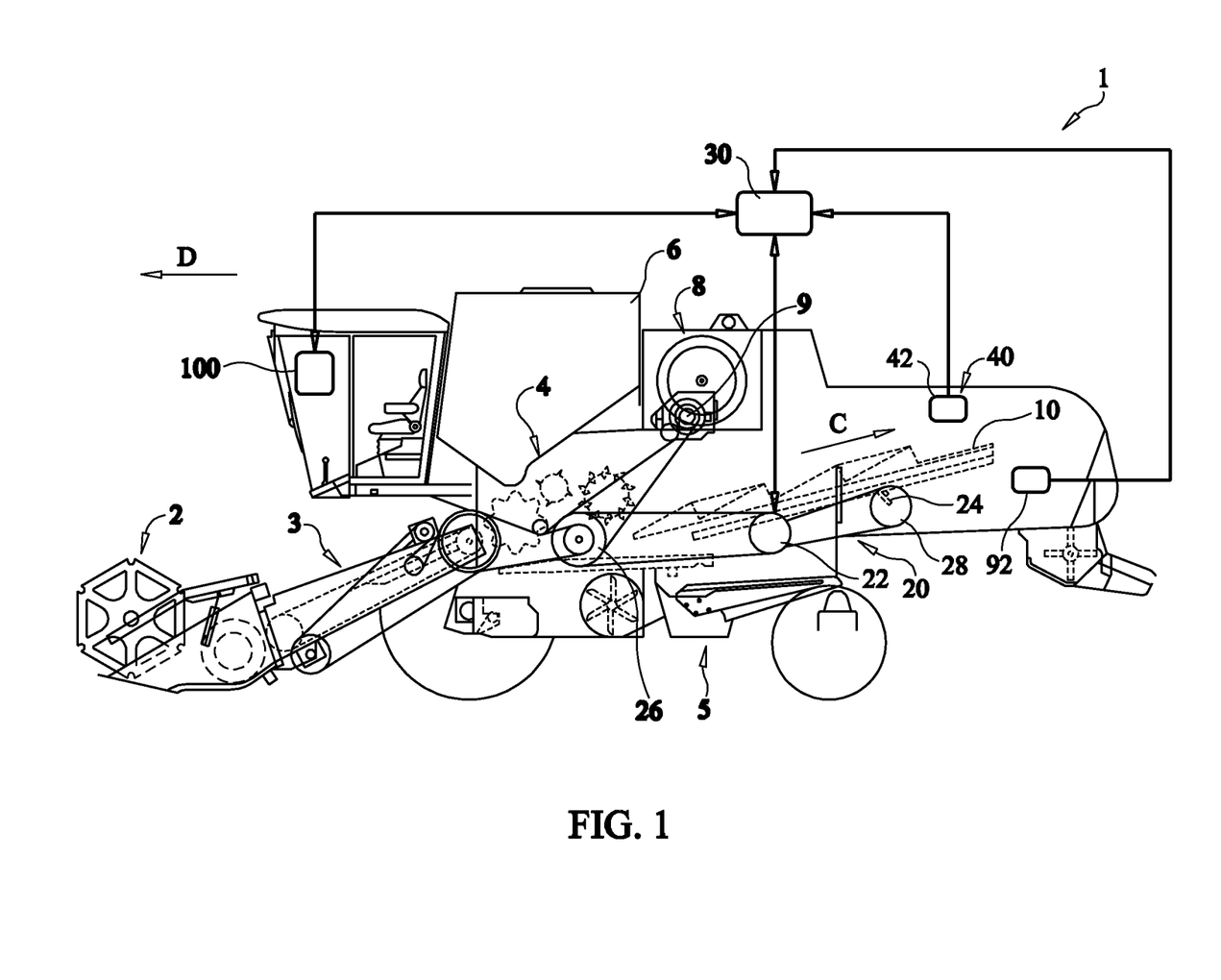
FIG. 1 schematically illustrates an embodiment of the combine harvester according to the invention.

FIG. 1 shows an embodiment of the combine harvester 1 according to the invention. It concerns a self-propelled combine harvester 1 that generally travels along the longitudinal driving direction D during a harvesting operation in which crop is collected from the field by means of a header 2 which feeds the crop by means of a feeder 3 to a threshing and separation unit 4. As shown in FIG. 1 the threshing and separation unit 4 comprises a plurality of lateral threshing and separation drums that cooperate with suitable concaves for releasing and separating the grain from the straw of the crop. The crop may comprise, for example, wheat, corn, rice, soybeans, rye, grass seed, barley, oats or similar. Grain which has been separated from the straw falls onto a grain cleaning mechanism 5, which comprises a blower and reciprocating sieves to separate chaff and other impurities from the grain and optionally collects unthreshed or partly threshed material, generally referred to as tailings for further processing. The cleaned grain is then elevated into a grain tank 6 and the tailings are fed either to a separate rethresher or back to the crop threshing and separation unit 4 for a renewed threshing action. The threshing and separation unit 4 feeds the remaining crop material, mostly in the form of straw, to a set of juxtaposed straw walkers 10 that are driven with an oscillating movement and transport the remaining crop material generally along the crop transport direction C to the rearward end of the combine harvester 1 for deposition on the field. The top surface of these straw walkers 10 is generally perforated to allow passage of residual grains to the straw walker bottom, which guides these grains forwardly and downwardly to the cleaning mechanism 5.

Conventionally all major units of the combine harvester are driven by power derived from a main drive system 8, mostly in the form of an internal combustion engine. The main drive system 8 often operates at a substantially constant speed and varies its output torque to meet the demand of a plurality of belt and/or chain drives powered of a directly driven engine output pulley 9, thus providing these with a continuous rotary motion at a predetermined frequency. As will be explained in further detail below, one of the units driven in this way is the straw walker 10. The straw walker 10 is connected to the main drive system 8 by means of a straw walker drive system 20. The straw walker drive system 20 converts the continuous rotary motion at a predetermined frequency of the main drive system 8 into an oscillating movement at a controllable frequency to drive the straw walker 10. In order to control this controllable frequency of the oscillating movement of the straw walker drive system 20, the combine harvester 1 comprises a straw walker control system 30. By increasing this controllable frequency the transport velocity of the crop on the straw walker 10 can be increased. By decreasing this controllable frequency the transport velocity of the crop on the straw walker 10 can be decreased. When the combine harvester 1 travels along its direction of movement D and experiences a positive longitudinal inclination, along this direction of movement D, which generally means it is traveling uphill, as a consequence of this, the transport velocity of the crop on the straw walker will be increased, leading to the risk of increased grain loss as time is shortened during which the crop material is handled by the straw walker 10. When the combine harvester 1 experiences a negative longitudinal inclination, which generally means it is traveling downhill, the transport velocity of the crop on the straw walker will decrease and there will be an increased risk of a decrease in throughput and also a risk for the formation of plugs as the crop material takes more time to travel along the straw walker 10. Also in this case there is a risk of increased grain loss as the crop material layer on the straw walker will become too thick for optimal separation of the grain.

In order to automatically counteract the variations in transport velocity on the straw walker 10 caused by variations in the longitudinal inclination of the combine harvester 1, it comprises an inclination module 40 that provides the straw walker control system 30 information on the inclination of the combine harvester 1. It is clear that in general information on the inclination of the combine harvester 1 from which the longitudinal inclination of the combine harvester 1 can be derived is to be provided by the inclination module 40. It is thus not necessary for the inclination module 40 to provide information on the longitudinal inclination of the combine harvester 1 per se. The straw walker control system 30 in this way will be enabled to automatically control the controllable frequency of the oscillating movement of the straw walker 10 in function of this information on the longitudinal inclination of the combine harvester 1. According to a particular simple embodiment, as shown in FIG. 1, the inclination module 40 comprises an inclination sensor 42 that is able to detect the longitudinal inclination of the combine harvester 1, this means the inclination generally along the direction of movement D. This inclination sensor 42 could be a known sensor that outputs a signal in function of the longitudinal inclination of the combine harvester 1. According to an alternative embodiment the inclination module could also comprise a field inclination module 44 that is able to derive longitudinal inclination signal from a positioning module 50 such as for example a gps module, which provides consecutive measurements of location information of the combine harvester 1. From these consecutive measurements of location information of the combine harvester 1, the position and orientation of the combine harvester in all three dimensions can be determined and equally any changes to them. As such also the longitudinal inclination can be determined by the field inclination module 44 from the measurements of the positioning module 50.

According to still a further embodiment the field inclination module 44 comprises field inclination information correlated to specific positions on the field. The field inclination module 44 then only needs to receive from the positioning module 50 the position and orientation of the combine harvester 1. Based on this information the field inclination module 44 can then calculate the longitudinal inclination of the combine harvester 1, which means combining the position and orientation of the combine harvester 1 as provided by the positioning module 50 and the field inclination information as provided by the field inclination module 44. This configuration allows to use field inclination information for future positions and future orientations of the combine harvester 1 and/or the use of geographical information systems that are able to provide field inclination information with a higher precision then for example available from the positioning module 50. The field inclination module 44 can for example comprise high precision digital terrain maps for the field in which the combine harvester 1 is operating or terrain maps created during a previous passage of an agricultural vehicle with a high precision gps system.

Figure 2:
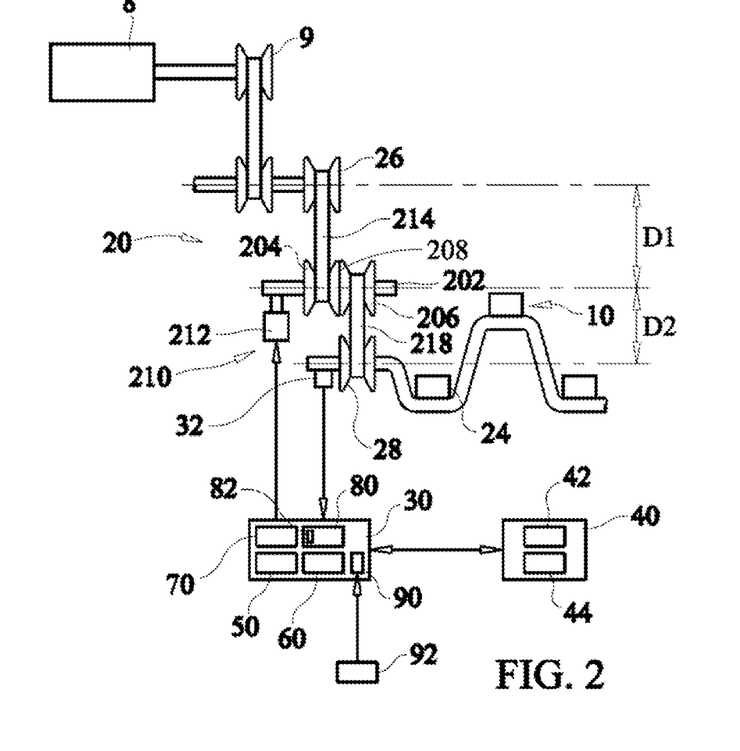
FIG. 2 schematically illustrates in more detail an embodiment of the straw walker drive system of the combine harvester according to the invention.

In order to take full advantage of the field inclination information as provided by the field inclination module 44 the combine harvester according to the alternative embodiment shown in FIG. 2 further comprises a planning module 60. Such a planning module 60 can for example be part of a navigational unit of a precision farming system, which provides guidance for or automatically steers the combine harvester 1 along a predetermined path over the field during operation. Such a planning module 60 can in this way thus provide information on planned, future positions and planned, future orientations of the combine harvester 1 to the inclination module 40. Based on this information the field inclination module 44 will then be able to calculate planned, future field inclination information relating to planned, future longitudinal inclinations of the combine harvester 1 allowing the straw walker control system 30 to anticipate any planned changes instead of merely reacting to these changes when they happen. This also allows the straw walker control system 30 to further compensate for the inertia of the straw walker drive system 20. This is especially useful when traversing the bottom of a valley, the top of a hill or during headland turns during which acute changes in the longitudinal inclination of the combine harvester 1 might occur. When for example a combine harvester 1 processes an uphill pass of the field, when approaching the headland, it will frequently execute a U-turn, and will subsequently proceed back downhill processing the adjoining pass. Such a short term switch from uphill to downhill operation requires a corresponding short term change from the straw walker control system 30. The planning module 60 allows the straw walker control system 30 to be informed of such a planned, future short term change before it actually takes place so that it can execute the necessary changes to the operation of the straw walker drive system 20 in a timely fashion.

According to the particular embodiment shown in FIG. 2, the straw walker control system 30 also comprises a field recording module 70. The recording module 70 records the current position of the combine harvester 1 as it travels along the field and feeds this information to the field inclination module 44. The field inclination module 44 is in this way able to compile field inclination information of the field which will for example allow this information to be used during future operations on the field. Additionally the recorded inclination information will allow the field inclination module 44 to calculate field inclination information correlated to planned, future positions and planned, future orientations of the combine harvester 1. This can for example be accomplished using a method such as for example described in WO2012/007549 for obtaining an anticipated field characteristic for a specific location in the field based on known field characteristics from neighbouring locations and assumptions about the variation of these field characteristics. For example it will be assumed that a future pass of the field will have approximately the same slope as an adjoining previous pass of the field. In this way, even without having available field inclination information for the entire field to be processed by the combine harvester the field inclination module 44 will still be able to calculate planned, future field inclination information correlated to planned, future positions and planned, future orientations of the combine harvester from the recorded field inclination information provided by the field recording module 70.

Figure 3:
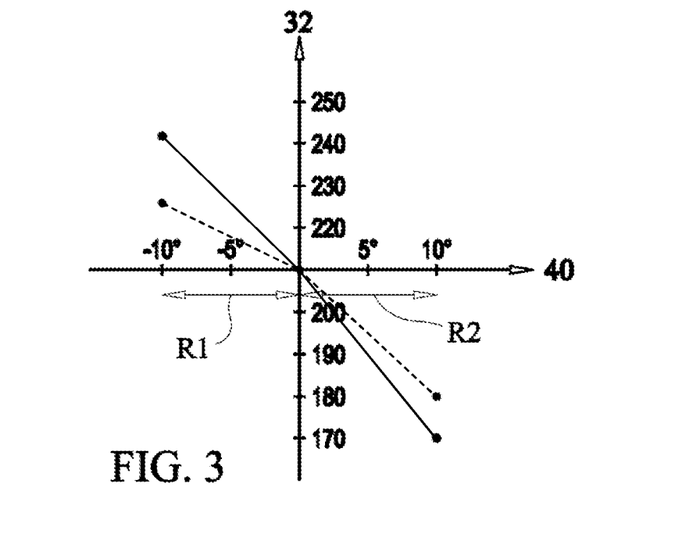
FIG. 3 schematically illustrates an advantageous correlation between the controllable frequency and the inclination of the combine harvester.

In the embodiment of FIG. 2, the straw walker control system 30 also comprises a configuration module 80. Such a configuration module 80 comprises a predetermined correlation between the controllable frequency of the oscillating movement of the straw walker 10 and the information on the longitudinal inclination of the combine harvester 1. Two such correlations are schematically shown in FIG. 3. It shows the correlation between the longitudinal inclination as scaled on the horizontal axis in degrees with respect to a horizontal position of the combine harvester 1 and the controllable frequency of the straw walker 10 as scaled on the vertical axis in revolutions per minute (rpm). One of these correlations is shown with a continuous line. It shows that at a positive longitudinal inclination of 10°, or about 20% uphill, the controllable frequency is about 170 rpm; at a longitudinal inclination of 0°, or on level ground, the controllable frequency is about 210 rpm; at a negative longitudinal inclination of −10°, or about 20% downhill, the controllable frequency is about 240 rpm. Another such correlation is shown in striped lines, which shows a smaller variation in the controllable frequency for the same range of variation in the longitudinal inclination. The configuration module 80 according to an embodiment further comprises a configuration storage module 82 comprising a plurality of stored predetermined correlations. The configuration module 80 is then for example able to select one of these stored correlations based on the crop type or harvesting conditions. The continuous line could for example be a stored correlation for harvesting wheat while the striped line could for example be a stored correlation for harvesting corn. According to an alternative embodiment the continuous line could for example be a stored correlation for harvesting crop with a high moisture content, while the striped line is a stored correlation for harvesting the same crop but with a low moisture content. It is clear that numerous other stored correlations could be available from the configuration storage module 82 to the configuration module 80 for specific crop types and/or harvesting conditions. The crop type and/or harvesting conditions could for example be inputted by an operator at a suitable operator interface 100 that allows the operator of the combine harvester 1 to interact with the straw walker control system 30. However the crop type could also be determined automatically when the combine harvester 1 comprises a header 2 with an identification module. Such an identification module provides information about the type of header that is being attached to the combine harvester 1 and thus allows to identify if the header is suitable for harvesting wheat or corn for example. When this information is provided to the configuration module 80 this will allow it to automatically select the most suitable stored correlation function. Alternatively harvesting conditions such as for example moisture content of the crop material or temperature could equally be determined automatically by means of suitable sensors.

From the embodiment shown in FIG. 3 it is also clear that the rate of change of the controllable frequencies correlated to a first range R1 of negative longitudinal inclinations is lower than the rate of change of the controllable frequency correlated to a second range R2 of positive longitudinal inclination. This is beneficial because when travelling uphill a faster drop in the controllable frequency can be allowed to keep the grain loss from rising by keeping the transport speed of the crop material on the straw walker 10 sufficiently low. Overshooting the optimum transport speed a little bit at the lower end takes into account the change in throwing angle by the straw walker elements and is also safe as this will not immediately have a negative effect on the grain loss.

During downhill operation however, the same holds true and in order to take into account the change in throwing angle by the straw walker elements and to stay at the safe side with respect to grain loss, it is advisable to operate the controllable frequency with a lower rate of change than that for the uphill operation. In this way the transport speed will be sufficiently high to avoid blockages or other negative effects on the operational efficiency of the combine harvester, while also avoiding any possible negative effects with respect to grain loss. It is clear that other suitable ranges R1 and R2 could be defined than those shown in FIG. 3, as long as the second range R2 relates to longitudinal inclinations that are higher than the longitudinal inclinations of the first range R1. It is further clear that according to alternative embodiments the use of ranges for the information on the inclination of the combine harvester 1 is not required as long as for one or more lower values of the information on the inclination there is correlated a lower rate of change of the controllable frequency when compared to one or more higher values of the information on the inclination.

The straw walker control system 30 of the embodiment of FIG. 2 also comprises a calibration module 90 connected to the correlation module 80. This calibration module 90 allows for further optimisations to the correlation of the configuration module 80. In order to enable this the calibration module 90 is connected to at least one evaluation sensor 92, such as for example the grain loss sensors arranged at the downstream end of the straw walker 10. Instead of requiring the operator to input for example the harvesting conditions such as for example the moisture content of the crop, the calibration module 90 can automatically try a plurality of changes to the predetermined correlation, while checking the effect on the measurements of the evaluation sensor 92 and subsequently modifying the predetermined correlation with one of the applied changes that lead to a desired change in the measurements of the evaluation sensor 92. According to a particularly efficient method of operation, the calibration module 90 could operate the combine harvester 1 during a calibration routine that lasts three passes of the field with three different correlations which are related to three different moisture levels, one for each pass of the field. Based on the results of the grain loss sensor 92 during each of these passes, the specific correlation could then be chosen that resulted in the most optimal situation with respect to grain loss. It is clear that other evaluation sensors 92 could be chosen, which monitor a suitable parameter or combination of parameters that relate to a desired operation of the combine harvester 1, such as for example the throughput of crop material, fuel consumption, etc.

As shown in FIGS. 1 and 2, the combine harvester 1 comprises a main drive system 8 providing a continuous rotary motion at a predetermined frequency. This rotary motion is transferred by means of a belt from the main drive pulley 9 to a first pulley 26 and subsequently to the straw walker drive system 20. This straw walker drive system 20 is connected to the main drive system 8 and comprises at least one belt variator system 22 to transform the continuous rotary motion at a predetermined frequency in a continuous rotatory motion at a controllable frequency as will be explained in further detail below. Subsequently the belt variator system 22 is connected to a crankshaft 24 to transform the continuous rotary motion at this controllable frequency into the oscillating movement at this controllable frequency for the straw walker 10. Such a belt variator might be a suitable embodiment of a belt variator known to a man skilled in the art, such as for example schematically shown in FIG. 1. In most such systems an actuator displaces a variator disc with an inclined contact surface for the belt in order to change the distance between the rotational axis of the belt variator and the belt during operation and as such change the controllable frequency. As shown in FIGS. 1 and 2 the straw walker control system 30 controls the controllable frequency by measuring the rotational speed of the crankshaft 24 by means of a suitable sensor 32 such as for example a rotational encoder and controlling an actuator of the belt variator 22 to set it so that the desired rotational speed of the crankshaft is achieved.

Figure 4:
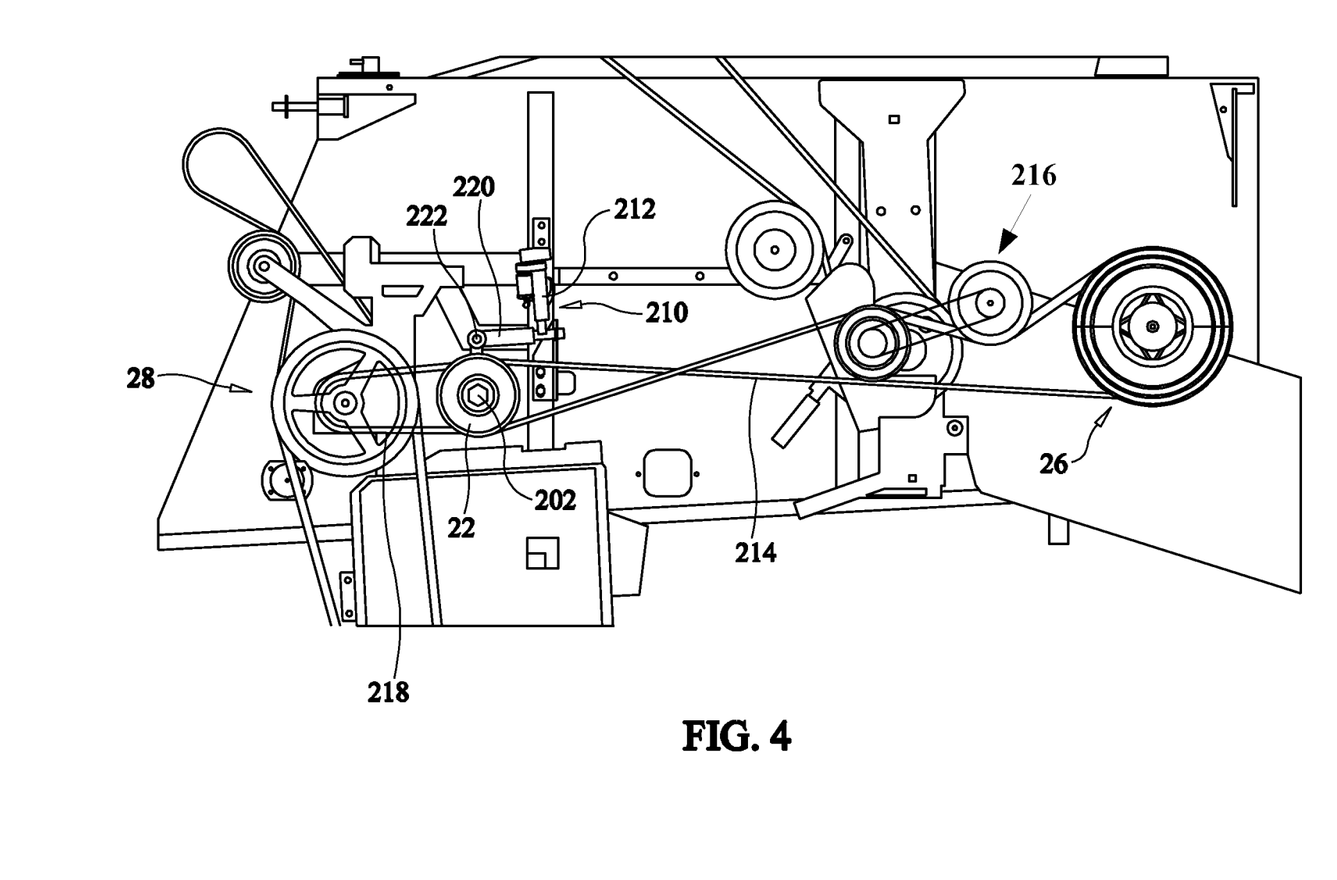
FIGS. 4 and 5 schematically show an embodiment of a straw walker drive system of FIG. 2 in different operating modes.
Figure 5:
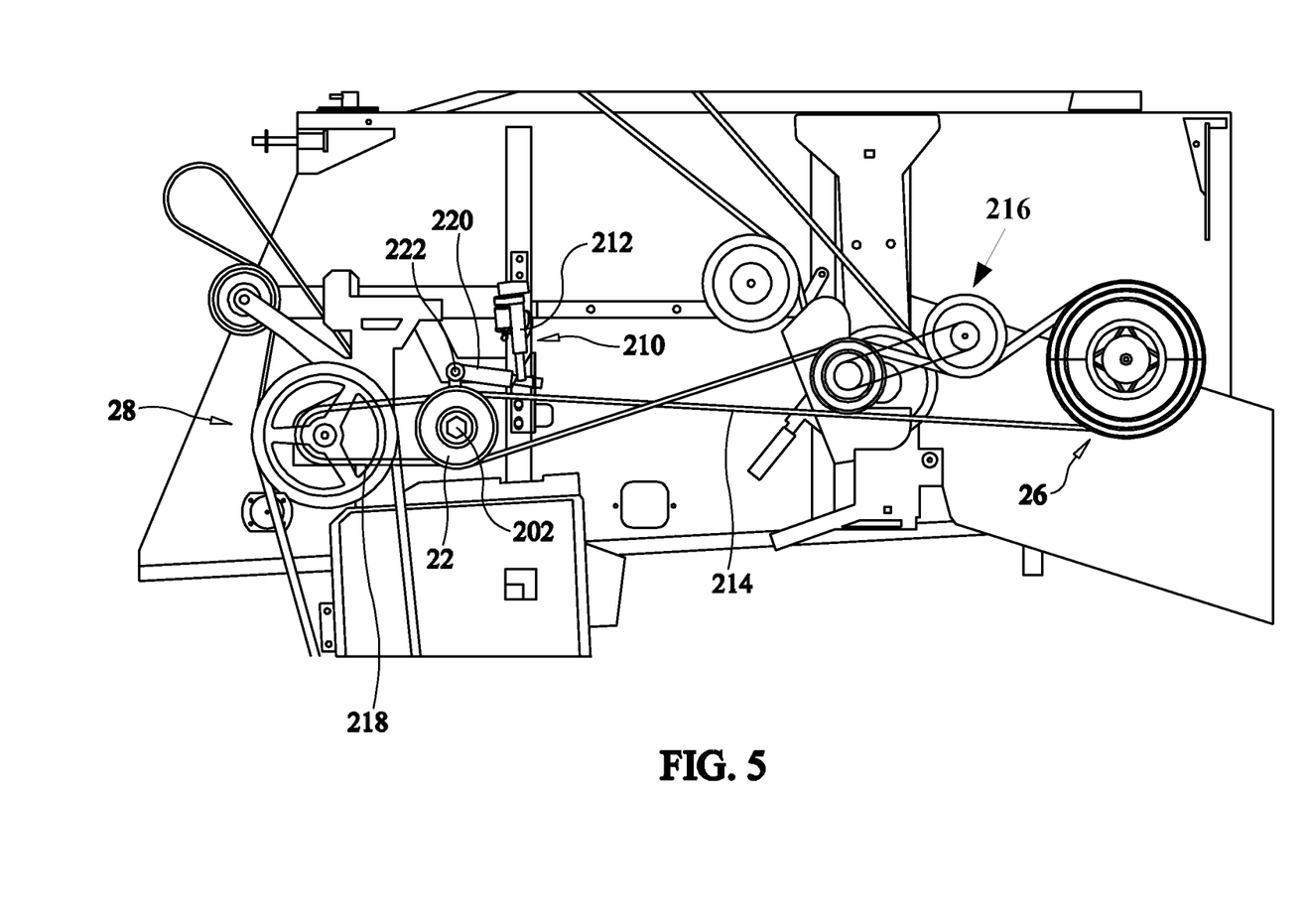
Figure 6:
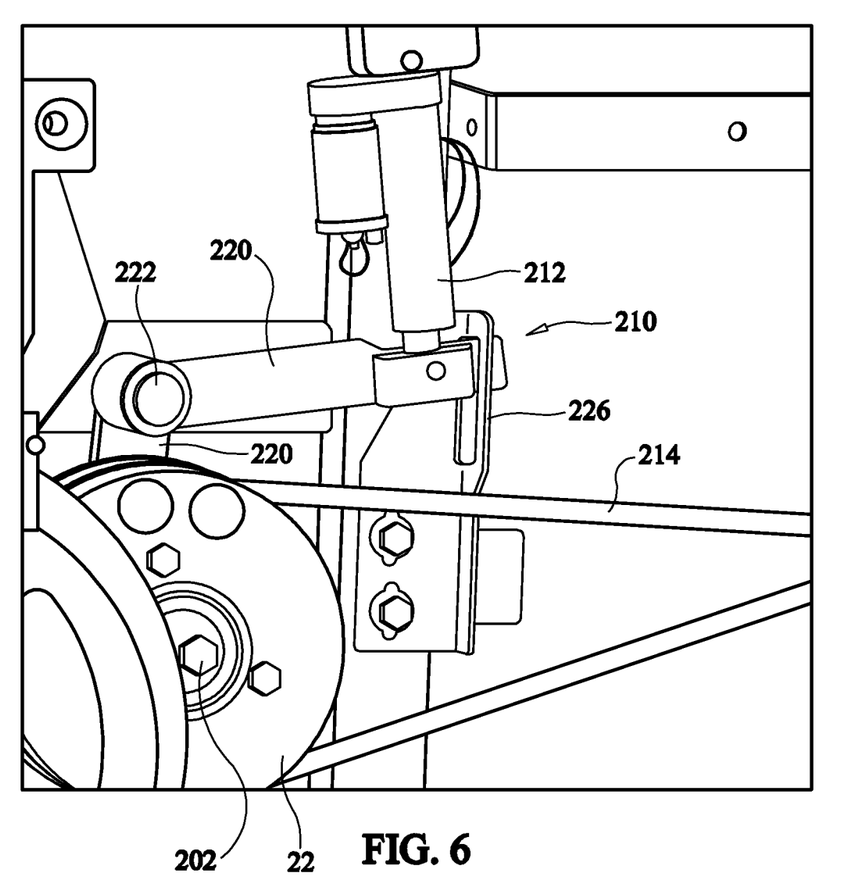
FIG. 6 shows the belt variator of the straw walker drive of FIGS. 4 and 5 in more detail.

Although several possible designs for the belt variator system 22 are known the embodiment shown in FIG. 2 and in more detail in FIGS. 4 to 7 is especially advantageous as it allows to modify an existing combine harvester to a combine harvester according to the invention without requiring extensive modifications. As schematically shown in FIG. 2 the alternative embodiment of the belt variator system 22, shown in more detail in FIG. 7, comprises a rotational shaft 202 on which a first variator disc 204 and a second variator disc 206 are arranged at a fixed distance with respect to each other at both axial ends of the rotational shaft 202. In between these first variator disc 204 and second variator disc 206 there is arranged a central variator disc 208. According to an embodiment, these first and second variator discs 204, 206 can be moved together along the axial direction of the rotational shaft 202. Such an axial movement of the assembly comprising the first and second variator disc causes the first and second transverse distance T1, T2 between the central variator disc 208 and respectively the first and second variator disc 204, 206 to change. A variator positioning system 210 comprises an actuator 212 that controls the position of this rotational shaft 202 with respect to a first pulley 26 that is driven from the main drive system 8, which is shown as center distance D1 in FIG. 2. The variator positioning system 210 respectively also controls the position with respect to a second pulley 28 that is connected to the crankshaft 24, which is shown as center distance D2 in FIG. 2. When the actuator 212 changes these distances D1 and D2, the position along the axial direction of the rotational shaft 202 of the assembly comprising the first and second variator discs 204, 206 will change with respect to the central variator disc 208 as dictated by the length of the first variator belt 214 and the second variator belt 218. This means that transverse distances T1 and T2 will change, while the sum of T1 and T2 will remain constant. As for example D1 is increased by means of actuator 212 and because the first variator belt 214 has a constant length, the first variator belt 214 will move closer to the rotational shaft 202, which in turn will cause the first variator disc 204 to move away from the central variator disc 208 along the axial direction of the rotational shaft 202, thus increasing the first transverse distance T1. The increase in the transverse distance T1 will cause a corresponding decrease in the transverse distance T2 that is necessary for the second variator belt to move further away from the rotational shaft 202 which balances out the decrease in center distance D2 in combination with the constant length of second variator belt 218. It is clear that, for the belt variator to function in this way, as is generally known to the man skilled in the art, and clearly shown in FIG. 7, the contact surface of the variator belt and the corresponding contact surface of the variator discs are suitably inclined with respect to the direction orthogonal to the axial direction of the rotational shaft 202. The first variator belt 214 is connected at one end to a pulley 26 of the main drive system 8 and is arranged at its other end between the first variator disc 204 and the central variator disc 208. The second variator belt 218 is connected at one end to a pulley 28 of the crankshaft 24 and is at its other end arranged between the second variator disc 206 and the central variator disc 208. In this way the variator positioning system 210 is able to transform the continuous rotary motion at a predetermined frequency into a continuous rotatory motion at a controllable frequency by means of repositioning the rotational shaft 202 of the belt variator system 22. Furthermore this form of belt variator system 22 can be arranged into an existing combine harvester 1 without requiring any modification to the pulleys of the main drive system as well as to the pulleys of the straw walker drive system. According to an alternative embodiment of the belt variator 22, the central variator disc 208 is arranged movable along the axial direction of the central shaft with respect to the first and second variator discs 204, 206, which are then arranged at a fixed axial position. As can be seen in FIGS. 4 and 5 it is clear that this embodiment of the belt variator 22 allows the use of a single belt tensioner 216 for providing sufficient tension to both variator belts 214, 218. This allows to modify an existing straw walker drive system without such a belt variator without requiring any additional changes then adding the belt variator and both variator belts.

Figure 7:
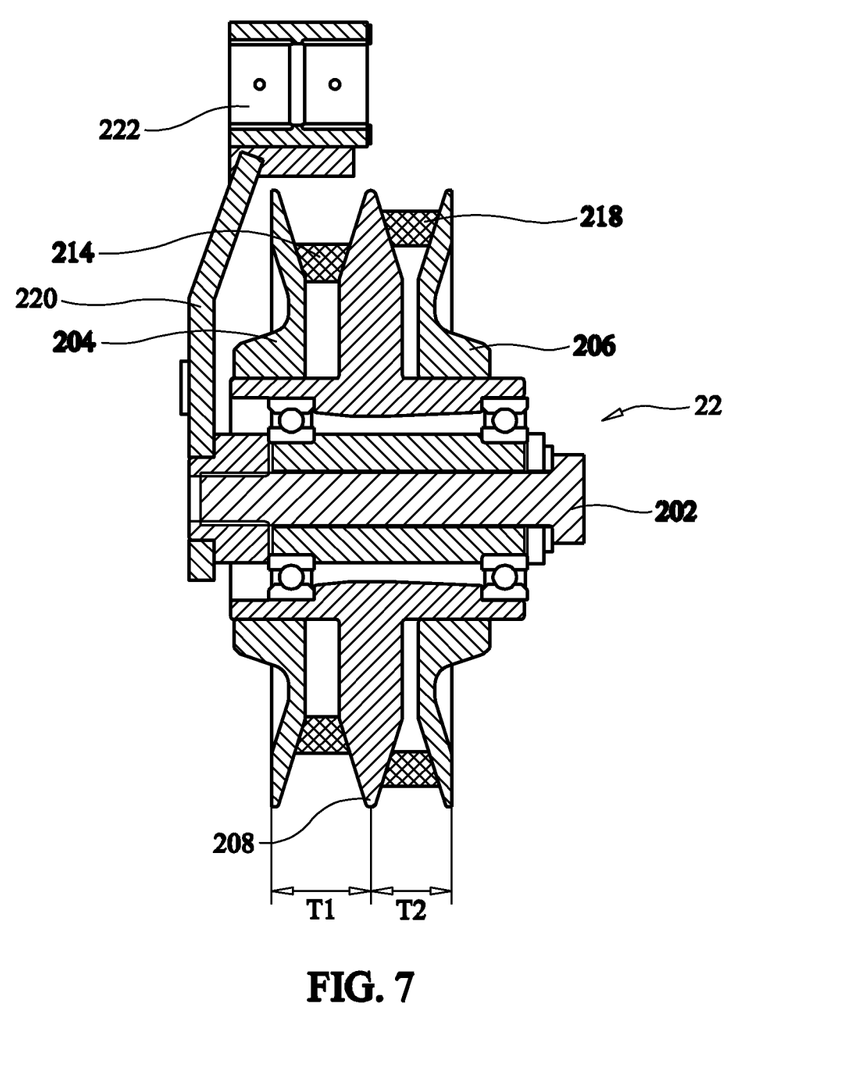
FIG. 7 shows a section of the belt variator of FIG. 6.

An embodiment of the belt variator system 22 in which the positioning system 210 further comprises a pivot arm 220 that pivots around a pivot axis 222 for connecting the rotational shaft 202 to the actuator 212 is shown in FIGS. 4 to 7. FIG. 4 shows the situation in which D1 is minimized because the actuator 212, which is for example a hydraulic or electrical actuator, is in its most retracted state. FIG. 5 shows the situation in which D1 is maximized because the actuator 212 is in its most extracted state. As further shown in more detail in FIG. 6, suitable stops 226 can be provided to limit the range of movement of the variator positioning system 210. In this embodiment the stops 226 are executed as a brace limiting the range of movement of the pivot arm 220. Finally FIG. 7 provides still a further detailed view of the variator system 22 by providing a sectional view of it in position corresponding to that of FIG. 5 in which D2 is minimized, which means that the second variator belt 218 will move outward and the first variator belt 214 will move inward with respect to the rotational shaft 202, causing the movable central variator disc 208 to the right as viewed in FIG. 7.

As is clear from the description of the embodiments above the method for operating such a combine harvester 1 is in general initiated by the straw walker control system 30 receiving an input signal representative of the information on the inclination of the combine harvester 1. This input signal is provided by the inclination module 40 based on for example measurements by an inclination sensor 42 or a positioning module 50. Subsequently the straw walker control system 30 calculates an output signal by processing the input signal by means of the predetermined correlation between the controllable frequency of the oscillating movement and the information on the inclination of the combine harvester such as for example shown in FIG. 3. The straw walker control system 30 then provides this output signal for controlling the controllable frequency of the oscillating movement to for example the variator positioning system 210.

According to a particular simple embodiment, where for example a positioning module 50 provides a height position of a combine, the input signal could be representative for a derivative of a height position of the combine harvester 1 with respect to time. This change of a height position in function of time is representative for the slope along the travelling direction of the combine harvester. Alternatively instead of the derivative with respect to time, the derivative with respect to a longitudinal position of the combine harvester 1 could be taken. Also here the change of the height position of the combine in function of the displacement of combine harvester along its direction of travel is proportional to its longitudinal inclination. According to still a further alternative instead of calculating a derivative, there can also be used a ratio of the differences of two height positions of the combine harvester 1 with respect the corresponding two points in time or longitudinal positions of the combine harvester 1. The output signal could be representative for an absolute value for the controllable frequency of the oscillating movement, however suitable alternatives are possible such as for example a relative value with respect to a reference value for the controllable frequency of the oscillating movement.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A combine harvester comprising:
  a straw walker;
  a straw walker drive system connected to the straw walker and configured to drive the straw walker with an oscillating movement at a controllable frequency; and
  a straw walker control system connected to the straw walker drive system and configured to control the controllable frequency of the oscillating movement,
  an inclination module coupled to the straw walker control system, the inclination module configured to provide information on an inclination of the combine harvester;
  the straw walker control system further comprising a configuration module comprising a predetermined correlation between the controllable frequency of the oscillating movement and the information on the inclination of the combine harvester, the straw walker control system further configured to control the controllable frequency of the oscillating movement as a function of the information on the inclination of the combine harvester by the predetermined correlation;
wherein the predetermined correlation comprises:
a first value of the information on inclination, and
a second value of the information on inclination relating to an inclination higher than the inclination related to the first value, a rate of change of the controllable frequencies correlated to the first value is being lower than a rate of change of the controllable frequency correlated to the second value.

2. A combine harvester according to claim 1, wherein the configuration module comprises a configuration storage module comprising a plurality of stored predetermined correlations for at least one of a corresponding plurality of crop types and harvesting conditions, and in that the predetermined correlation is selectable from the plurality of stored predetermined correlations.

3. A combine harvester according to claim 2, further comprising a header with an identification module that is coupled to the configuration module, and the configuration module is arranged to automatically select the predetermined correlation from the plurality of stored predetermined correlations in function of the crop type correlated to the type of header as identified by the identification module.

4. A combine harvester according to claim 1, wherein the straw walker control system further comprises a calibration module connected to the configuration module and at least one evaluation sensor configured to evaluate an operating parameter of the straw walker, the calibration module configured to modify the predetermined correlation in function of the measurements of the at least one evaluation sensor.

5. A combine harvester according to claim 1, wherein during a calibration routine, the calibration module is configured to:
apply at least one predetermined modification to the predetermined correlation;
modify the predetermined correlation if one of the predetermined modifications leads to a predetermined change in the measurements of the at least one evaluation sensor.

6. A combine harvester according to claim 1, wherein the inclination module comprises an inclination sensor configured to detect the inclination of the combine harvester.

7. A combine harvester according to claim 1, wherein the straw walker control system is further coupled to a positioning module connected to the inclination module and configured to provide information on the position and orientation of the combine harvester, and in that
the inclination module comprises a field inclination module comprising field inclination information correlated to specific positions on the field, the field inclination module being configured to calculate the inclination of the combine harvester from the position and the orientation of the combine harvester and the field inclination information.

8. A combine harvester according to claim 7, wherein the straw walker control system further comprises a planning module connected to the positioning module and the inclination module, the planning module configured to provide information on planned, future positions and planned, future orientations of the combine harvester, and the field inclination module is further configured to calculate a planned future inclination of the combine harvester from a planned, future field inclination information relating to the planned, future position and the planned, future orientation of the combine harvester.

9. A combine harvester according to claim 8, wherein the straw walker control system is further coupled to a field recording module connected to the field inclination module, the field recording module configured to record the field inclination information at a current position of the combine harvester, and
in that the field inclination module is further configured to calculate the planned, future field inclination information from the recorded field inclination information.

10. A combine harvester according to claim 1, wherein the information on the inclination of the combine harvester comprises information on the longitudinal inclination of the combine harvester.

11. A combine harvester according to claim 1, wherein the combine harvester further comprises a main drive system providing a continuous rotary motion at a predetermined frequency, and
the straw walker drive system is connected to the main drive system and comprises:
at least one belt variator system connected to the main drive system, coupled to the straw walker control system and configured to be controlled by the straw walker control system to transform the continuous rotary motion at the predetermined frequency of the main drive system in a continuous rotatory motion at the controllable frequency,
at least one crankshaft connected to the belt variator system and the straw walker to transform the continuous rotary motion at the controllable frequency into the oscillating movement at the controllable frequency.

12. A combine harvester according to claim 11, wherein the belt variator system comprises:
rotational shaft;
first variator disc and a second variator disc arranged at a fixed distance with respect to each other at both axial ends of the rotational shaft;
central variator disc arranged between the first variator disc and the second variator disc, the central variator disc or the first and second variator discs being movable along the axial direction of the rotational shaft to change a first and a second transverse distance between the central variator disc and the first and second variator disc respectively;
first variator belt connected at one end to a first pulley of the main drive system and arranged at its other end between the first variator disc and the central variator disc;
second variator belt at one end arranged between the second variator disc and the central variator disc, and at its other end connected to a second pulley of the crankshaft;
variator positioning system connected to the rotational shaft and comprising an actuator configured to control the position of the rotational shaft with respect to the first pulley and the second pulley causing a first and second center distance between the rotational shaft and respectively the first and second pulley to change in order to transform the continuous rotary motion at the predetermined frequency in the continuous rotatory motion at the controllable frequency.

13. A method for operating a combine harvester comprising the steps of:

receiving with a straw walker control system an input signal representative of information on an inclination of the combine harvester provided by the inclination module;

calculating an output signal with the straw walker control system by processing the input signal by a predetermined correlation between a controllable frequency of a oscillating movement and the information on the inclination of the combine harvester, wherein the predetermined correlation comprises a first value of the information on inclination, and a second value of the information on inclination which relates to an inclination that is higher than the inclination related to the first value, a rate of change of the controllable frequencies correlated to the first value being lower than a rate of change of the controllable frequency correlated to the second value; and providing with the straw walker control system the output signal for controlling the controllable frequency of the oscillating movement, the straw walker control system connected to a straw walker drive system of a straw walker and the drive system connected to and configured to drive the straw walker with the oscillating movement at the controllable frequency.

14. A method for operating a combine harvester according to claim 13, wherein the input signal is representative for one or more of the following:

a derivative of a height position of the combine harvester with respect to time or a longitudinal position of the combine harvester;

a ratio of the differences of two height positions of the combine harvester with respect the corresponding two points in time or longitudinal positions of the combine harvester; and In that the output signal is representative for one or more of the following:

an absolute value for the controllable frequency of the oscillating movement;

a relative value with respect to a reference value for the controllable frequency of the oscillating movement.

* * * * *